(12) United States Patent
Yang et al.

(10) Patent No.: US 11,017,918 B2
(45) Date of Patent: May 25, 2021

(54) SEMI-CONDUCTIVE COMPOSITION FOR POWER CABLE

(71) Applicant: DYM SOLUTION CO., LTD., Cheonan-si (KR)

(72) Inventors: Jong Seok Yang, Cheonan-si (KR); Ki Joung Lee, Cheonan-si (KR); Geun Bae Jeon, Cheonan-si (KR); Dong Ha Park, Seoul (KR)

(73) Assignee: DYM SOLUTION CO., LTD., Cheonan-si (KR)

( * ) Notice: Subject to any disclaimer, the term of this patent is extended or adjusted under 35 U.S.C. 154(b) by 30 days.

(21) Appl. No.: 15/835,305

(22) Filed: Dec. 7, 2017

(65) Prior Publication Data

US 2019/0180889 A1 Jun. 13, 2019

(30) Foreign Application Priority Data

Dec. 7, 2017 (KR) .................. 10-2017-0167471

(51) Int. Cl.

| H01B 9/02 | (2006.01) |
| H01B 3/44 | (2006.01) |
| C08L 23/08 | (2006.01) |
| C08L 51/06 | (2006.01) |
| C08K 3/04 | (2006.01) |
| H01B 9/00 | (2006.01) |
| C08K 5/13 | (2006.01) |
| C08K 5/14 | (2006.01) |
| C08K 5/17 | (2006.01) |
| C08K 5/10 | (2006.01) |
| C08K 5/3437 | (2006.01) |

(52) U.S. Cl.
CPC .............. *H01B 3/44* (2013.01); *C08K 3/04* (2013.01); *C08K 5/10* (2013.01); *C08K 5/13* (2013.01); *C08K 5/14* (2013.01); *C08K 5/17* (2013.01); *C08K 5/3437* (2013.01); *C08L 23/0815* (2013.01); *C08L 23/0869* (2013.01); *C08L 51/06* (2013.01); *H01B 9/001* (2013.01); *H01B 9/027* (2013.01); *C08L 2312/00* (2013.01)

(58) Field of Classification Search
CPC ........................................................ H01B 9/027
USPC ..................................... 174/102 SC, 120 SC
See application file for complete search history.

(56) References Cited

U.S. PATENT DOCUMENTS

| 6,894,101 | B2 * | 5/2005 | Paul ........................ | C08L 23/06 524/100 |
| 2007/0244244 | A1 * | 10/2007 | Bertoux ................. | B82Y 30/00 524/495 |
| 2012/0305284 | A1 * | 12/2012 | Nilsson .................... | H01B 3/20 174/110 SR |
| 2013/0284486 | A1 * | 10/2013 | Nilsson .................. | H01B 3/441 174/107 |

FOREIGN PATENT DOCUMENTS

| CN | 105295364 A | 2/2016 |
| KR | 20040085896 A | 10/2004 |
| KR | 20060111019 A | 10/2006 |
| KR | 20090064664 A | 6/2009 |
| KR | 20100049661 A | 5/2010 |
| KR | 20120097685 A | 9/2012 |

\* cited by examiner

*Primary Examiner* — Chau N Nguyen
(74) *Attorney, Agent, or Firm* — McCoy Russell LLP

(57) ABSTRACT

Provided is a semi-conductive composition for a power cable, more particularly, a semi-conductive composition for a power cable having excellent mechanical properties and electrical properties, and more specifically, a semi-conductive composition for a power cable capable of having improved scorch stability, improved surface smoothness, improved space charge accumulation suppression characteristic to thereby be applicable to an ultra-high voltage direct current power cable.

9 Claims, No Drawings

SEMI-CONDUCTIVE COMPOSITION FOR POWER CABLE

TECHNICAL FIELD

The present invention relates to a semi-conductive composition for a power cable. More particularly, the present invention relates to a semi-conductive composition for a power cable having excellent mechanical properties and electrical properties. More specifically, the present invention relates to a semi-conductive composition for a power cable capable of having improved scorch stability, improved surface smoothness, improved space charge accumulation suppression characteristic to thereby be applicable to an ultra-high voltage direct current power cable.

BACKGROUND ART

An ultra-high voltage direct current (DC) power cable has a system of converting a high voltage alternating current (AC) power to a direct current (DC) by using an AC/DC power converter and transmitting electricity, followed by conversion to an alternating current by using a DC/AC converter to supply power. This system is advantageous in that power loss is low and voltage is low as compared to the AC, thereby facilitating insulation. Because of these advantages, the ultra-high voltage direct current (DC) power cable is regarded as a connection plan for a power system of renewable energy, especially, the best alternative for power transmission of large-scale offshore wind farm.

There is a demand for an insulation composition or a semi-conductive composition having excellent insulation performance which is able to withstand an ultra-high voltage in order to transmit electricity at an ultra-high voltage.

The semi-conductive composition for an ultra-high voltage DC power cable is required to have main properties such as a technique for reducing space charge due to polarity reversal which is a DC characteristic and a space charge effect by cross-linking agent byproducts, a technique for improving surface smoothness so as to decrease an electrode effect at an interface with an insulation layer, and a technique for making scorch stability excellent according to long cable length drum to achieve long-term extrudability, etc. However, study of semi-conductive compositions for a DC power cable is now in its early stages, and accurate measurements and data according to material improvements are not disclosed.

The semi-conductive composition for a high voltage or ultra-high voltage DC cable needs to solve the space charge problem due to polarity reversal which is a direct current characteristic. To solve this problem, various polymer materials and compositions of the power cable have been developed to provide electrical insulation and semi-conductive properties. In addition, since the semi-conductive composition for a DC cable requires maintenance and continuous performance over a long period of time of the power cable, polymer materials constituting the power cable require excellent electrical properties and durability, and should satisfy a property that initial performance is stably maintained even if it is used over a long time.

Among constituent layers of the power cable, the semi-conductive composition is intended to protect the insulation layer by radially uniformizing a local electric field since a high voltage may be applied to the insulation layer due to electric field distortion that may occur between a conductor and an insulator of the power cable.

Particularly, regarding the space charge property of the power cable, charges (electrons, holes, and ions) are accumulated inside the insulation material according to selection of components for the composition of the semi-conductive material, which causes the electric field distortion. These accumulated charges are generated from internal components of the insulation material or from the semi-conductive composition and the space charge trapped in the power cable changes electric field distribution inside, and thus performance of the power cable may be lost even under stress lower than performance expectation or design value of the original power cable.

Therefore, the technology relating to the semi-conductive composition in the ultra-high voltage or high voltage power cable is an important technology to secure long-term reliability of the DC power cable together with promotion of insulation reliability of electric power equipment and to be expected to improve the reliability of the existing electric power facility together with improvement of insulation design technology of the electric power facility.

In the space charge property of such a DC power cable, the charges (electrons, holes, and ions) are accumulated inside the insulation material, and thus an electric field distortion is caused. The present inventors studied to solve the above-described problems, and filed Korean Patent Laid-Open Publication Nos. 2009-0064664A and 2012-0097685A. Korean Patent Laid-Open Publication No. 2009-0064664A discloses a semi-conductive material for an ultra-high voltage or high voltage cable by a combination of carbon black and an antioxidant. Korean Patent Laid-Open Publication No. 2012-0097685A discloses a technique of a semi-conductive composition of an ultra-high voltage cable in which carbon nanotube and a nucleating agent are mixed to reduce accumulation of the space charge.

However, the conventional semi-conductive compositions still have disadvantages in that the space charge occurs, the surface smoothness is lowered, and the space charge is not sufficiently reduced, and still have a problem that dispersibility between a base resin and conductive particles is reduced.

RELATED ART DOCUMENT (Patent Document 1) Korean Patent Laid-Open Publication No. 2009-0064664A (Jun. 22, 2009)
(Patent Document 2) Korean Patent Laid-Open Publication No. 2012-0097685A (Sep. 5, 2012)

DISCLOSURE OF INVENTION

Technical Problem

An embodiment of the present invention is directed to providing a semi-conductive composition to be used in a power cable, more particularly in an ultra-high voltage direct current power cable, in which space charge is significantly reduced, surface protrusion characteristic and surface roughness required in the ultra-high voltage power cable are reduced, and mechanical properties and electrical properties are excellent.

Specifically, an embodiment of the present invention is directed to providing a semi-conductive composition for a power cable capable of having excellent long-term extrudability according to long cable length drum of an ultra-high voltage direct current power cable, reducing a charge amount ionized by residues of a cross-linking reaction of raw subsidiary materials and charges due to polarity reversal according to AC/DC/AC conversion, and having excellent mechanical properties.

Another embodiment of the present invention is directed to providing a semi-conductive composition for a power cable capable of having improved surface smoothness and reduced surface protrusion for decreasing an electrode effect at an interface with an insulation layer, and optimizing dispersibility of respective raw materials to improve surface smoothness.

Technical Solution

In one general aspect, a semi-conductive composition for a power cable includes:
(A) a base resin including an ethylene-butyl acrylate copolymer,
(B) a cross-linking inhibitor which is any one selected from 2,4-diphenyl-4-methyl-1-pentene and 1,4-hydroquinone, or a mixture thereof,
(C) a carbon black which is any one selected from acetylene black and furnace black, or a mixture thereof,
(D) a fatty acid ester which is any one selected from glycerin fatty acid ester and decaglycerin fatty acid ester, or a mixture thereof,
(E) an antioxidant, and
(F) a cross-linking agent.

Advantageous Effects

According to the present invention, it is possible to provide the semi-conductive composition for a power cable in which space charge is remarkably reduced, scorch stability according to scorch time is improved, surface protrusion and surface roughness are reduced to have excellent surface smoothness, and mechanical and electrical properties are also satisfied. More specifically, since the physical properties are able to be satisfied, it is possible to provide a composition applicable to the ultra-high voltage direct current (DC) cable.

Further, the present invention also has the effect of significantly reducing the space charge, thereby solving the problem of dielectric breakdown due to the accumulation of space charges, and reducing the volume resistance.

DETAILED DESCRIPTION OF EMBODIMENTS

Hereinafter, the present invention is described in more detail by explaining specific exemplary embodiments or Examples with reference to the accompanying drawings. It should be understood, however, that the following specific exemplary embodiments or Examples are only illustrative of the present invention in detail, and the present invention is not limited thereto, and may be implemented in various forms.

In addition, unless defined otherwise, all technical and scientific terms used herein have the same meanings as commonly understood by one of those skilled in the art to which the present invention pertains. Terms used herein have purposes of effectively describing specific exemplary embodiments only and are not intended to limit the present invention.

In addition, singular forms used in the specification and the appended claims are intended to include plural forms as well, unless otherwise specified in the context.

The present inventors found that by using an ethylene-butyl acrylate copolymer as a matrix resin, it was possible to provide a composition in which supply of materials was easily performed and mechanical and electrical properties were excellent. Further, the present inventors found that by using the ethylene-butyl acrylate copolymer in combination with components (B) to (F) of the present invention, it was possible to provide a semi-conductive composition for a power cable in which space charge was remarkably reduced, scorch stability according to scorch time was improved, surface protrusion and surface roughness were reduced to have excellent surface smoothness, and mechanical and electrical properties were also satisfied, and completed the present invention.

An exemplary embodiment of the present invention is to provide a semi-conductive composition for a power cable including:
(A) a base resin including an ethylene-butyl acrylate copolymer.
(B) a cross-linking inhibitor which is any one selected from 2,4-diphenyl-4-methyl-1-pentene and 1,4-hydroquinone, or a mixture thereof,
(C) a carbon black which is any one selected from acetylene black and furnace black, or a mixture thereof,
(D) a fatty acid ester which is any one selected from glycerin fatty acid ester and decaglycerin fatty acid ester, or a mixture thereof,
(E) an antioxidant, and
(F) a cross-linking agent.

In an exemplary embodiment of the present invention, 0.05 to 3 parts by weight of the cross-linking inhibitor (B), 30 to 70 parts by weight of the carbon black (C), 0.05 to 3 parts by weight of the fatty acid ester (D), 0.05 to 3 parts by weight of the antioxidant (E), and 0.05 to 3 parts by weight of the cross-linking agent (F) may be included based on 100 parts by weight of the base resin (A).

In an exemplary embodiment of the present invention, in the ethylene-butyl acrylate copolymer, a content of butyl acrylate is 5 to 20 wt %, and a melt index measured at 190° C. and 2.16 kg according to ASTM D1238 is 1 to 30 g/10 min.

In an exemplary embodiment of the present invention, the base resin (A) may further include any one or two or more resins selected from an ethylene-ethyl acrylate copolymer, an ethylene-methyl acrylate copolymer, and an ethylene-vinyl acetate copolymer.

In an exemplary embodiment of the present invention, the semi-conductive composition for a power cable may further include: a polyethylene-based resin grafted with maleic anhydride.

In an exemplary embodiment of the present invention, the polyethylene-based resin grafted with the maleic anhydride may have an amount of 0.1 to 20 parts by weight based on 100 parts by weight of the base resin (A).

In an exemplary embodiment of the present invention, the antioxidant may be any one or a mixture of two or more selected from the group consisting of a hindered phenol-based compound and a hindered amine-based compound.

In an exemplary embodiment of the present invention, the cross-linking agent may be any one or a mixture of two or more selected from t-butyl cumyl peroxide, benzoyl peroxide, lauryl peroxide, cumene hydroperoxide, dicumyl peroxide, methyl ethyl ketone peroxide, 2,5-dimethyl-2,5-di(t-butylperoxy)hexane, di-t-butyl peroxide, t-butyl peroxybenzoate, α,α-bis(t-butylperoxy isopropyl)benzene, and α,α-bis(t-butylperoxy)-1,3-diisopropyl benzene.

In an exemplary embodiment of the present invention, the power cable may be an ultra-high voltage direct current power cable.

In an exemplary embodiment of the present invention, a scorch time measured at 145° C. and t5 according to ASTM D1646 may be 40 minutes or more, the number of protrusions having a size of 50 to 100 Lm may be 5/cm² or less, and a volume resistance measured at 90° C. according to ASTM D991 may be 200 Ω·cm or less.

Hereinafter, each constitution of the present invention is described in more detail.

Specifically, for example, a first exemplary embodiment of the present invention is to provide a semi-conductive composition for a power cable in which space charge is remarkably reduced, scorch stability according to scorch time is improved, surface protrusions and surface roughness are reduced to have excellent surface smoothness, and mechanical and electrical properties are also satisfied by using a combination of the components (A) to (F).

More specifically, 0.05 to 3 parts by weight of the cross-linking inhibitor (B), 30 to 70 parts by weight of the carbon black (C), 0.05 to 3 parts by weight of the fatty acid ester (D), 0.05 to 3 parts by weight of the antioxidant (E), and 0.05 to 3 parts by weight of the cross-linking agent (F) may be included based on 100 parts by weight of the base resin (A), thereby providing the composition in which physical properties are better exhibited to be applicable to a semi-conductive composition for an ultra-high voltage direct current power cable.

According to a second exemplary embodiment of the present invention, by further including a polyethylene-based resin grafted with maleic anhydride to the combination of the above-described components (A) to (F), it is possible to further reduce the volume resistance, to further reduce the space charge, and to increase long-term stability of a power cable, and to further improve mechanical properties.

More specifically, 0.05 to 3 parts by weight of the cross-linking inhibitor (B), 30 to 70 parts by weight of the carbon black (C), 0.05 to 3 parts by weight of the fatty acid ester (D), 0.05 to 3 parts by weight of the antioxidant (E), 0.05 to 3 parts by weight of the cross-linking agent (F), and 0.1 to 20 parts by weight of the polyethylene-based resin grafted with the maleic anhydride may be included based on 100 parts by weight of the base resin (A).

In an exemplary embodiment of the present invention, the semi-conductive composition for a power cable may be a semi-conductive composition for an ultra-high voltage direct current power cable. The ultra-high voltage means a high voltage of more than 132 kV to 800 kV or less.

In an exemplary embodiment of the present invention, when the ethylene-butyl acrylate copolymer used as the base resin (A) is kneaded with the components (B) to (F), it is possible to remarkably improve dispersibility of the components other than the ethylene-butyl acrylate copolymer while simultaneously maintaining sufficient mechanical strength, and thus, appearance of the cable may be made particularly uniform as compared with other resins to prevent the space charge from increasing.

In an exemplary embodiment of the present invention, the ethylene-butyl acrylate copolymer is not limited, but for example, may be an ethylene-butyl acrylate copolymer in which a content of butyl acrylate is 5 to 20 wt %, and a melt index measured at 190° C. and 2.16 kg according to ASTM D1238 is 1 to 30 g/10 min. The above-described range is preferred since the mechanical properties may be excellent, kneading property and dispersibility may be improved to thereby exhibit a physical property in which long-term extrudability is excellent, and the surface smoothness may be improved, but is not limited thereto.

In an exemplary embodiment of the present invention, the base resin may further include any one or two or more resins selected from an ethylene-ethyl acrylate copolymer, an ethylene-methyl acrylate copolymer, and an ethylene-vinyl acetate copolymer in addition to the ethylene-butyl acrylate copolymer. In an exemplary embodiment of the present invention, as the base resin, the ethylene-butyl acrylate copolymer may be used alone, or the ethylene-butyl acrylate copolymer may be mixed with any one or two or more resins selected from an ethylene-ethyl acrylate copolymer, an ethylene-methyl acrylate copolymer, and an ethylene-vinyl acetate copolymer. By further including any one or two or more resins selected from the ethylene-ethyl acrylate copolymer, the ethylene-methyl acrylate copolymer, etc., and the ethylene-vinyl acetate copolymer, processability and mechanical properties may be controlled. Regarding a mixing ratio of the resins, a content of the ethylene-butyl acrylate copolymer is preferably 70 wt % or more, more specifically 70 to 100 wt %, and more specifically 80 to 99 wt % based on the total content of the base resin in exhibiting physical properties to be desired, but the content is not limited thereto.

In an exemplary embodiment of the present invention, the cross-linking inhibitor (B) functions to prevent a problem that cross-linking is promoted and surface smoothness is significantly lowered when the base resin and the cross-linking agent are kneaded and extruded at a high temperature during extrusion, thereby inducing reduction of the space charge. Specifically, for example, any one selected from 2,4-diphenyl-4-methyl-1-pentene and 1,4-hydroquinone, or a mixture thereof may be used.

It is preferable to use the cross-linking inhibitor at an optimum content since the cross-linking inhibitor inhibits a cross-linking reaction. A content of the cross-linking inhibitor may be 0.05 to 3 parts by weight, more specifically, 0.1 to 2 parts by weight, and more specifically, 0.15 to 1.0 part by weight based on 100 parts by weight of the base resin (A), but is not limited thereto. In the above-described range, sufficient cross-linking may be induced without impairing the processability, and the cross-linking may be promoted at the time of extrusion to form protrusions on a surface, and thus the surface smoothness may be prevented from being inhibited. In addition, since a general amount of electric wire of an ultra-high voltage direct current power cable is large as 50 to 200 km, time required for an extrusion molding process may be about 20 to 30 days, and thus, long-term extrudability may be very important. The above-described content range is preferable since a scorch time is increased so as to perform long-term extrusion, but is not limited thereto.

In an exemplary embodiment of the present invention, the carbon black (C) is used for imparting conductivity, and may be any one selected from acetylene black and furnace black, or a mixture thereof. Specifically, for example, the carbon black may have a sieve residue content of 25 mesh (45 µm) according to ASTM D1514-01 of 10 ppm or less, and more specifically 1 to 10 ppm, and an ash content according to ASTM D1506-99 of 0.02 wt % or less, and more specifically 0.005 to 0.020 wt %, and a specific surface area according to ASTM D3037-89 of 60 to 150 m²/g. The above-described range is preferable since it is possible to exhibit high purity and high conductivity, to provide excellent kneading property with the base resin and other components, and to improve the surface smoothness, but is not limited thereto. It is preferable to use the high purity and high conductivity acetylene black or the high purity and high conductivity furnace black since space charge accumulation suppression characteristic may be improved as compared to general carbon black. In addition, electric properties, mechanical properties, and surface protrusion characteristic, etc., required by the ultra-high voltage direct current power cable may be improved even with a small content. As a result, since a thickness of an insulator may be remarkably reduced, it is possible to produce a lightweight power cable and to reduce the total weight of the ultra-high voltage DC power cable. Thus, it is economical since production cost and transportation cost may be reduced, and installation in existing installed conduits may be achieved.

A content of the carbon black is not particularly limited as long as it is sufficient to exhibit conductivity. Specifically, for example, the content of the carbon black may be 30 to 70 parts by weight, more specifically 40 to 60 parts by weight, and more specifically, 45 to 55 parts by weight based on 100 parts by weight of the base resin (A). The above-described range is preferable since it is possible to exhibit physical properties in which dispersibility may be excellent, kneadability with other components may be excellent, and electrical properties may be excellent, but is not limited thereto.

In an exemplary embodiment of the present invention, the fatty acid ester (D) serves to improve voltage breakdown characteristic by improving an interfacial characteristic between an insulator layer and a semi-conductive layer. In addition, the fatty acid ester is combined with the carbon black to penetrate into a space of the carbon black so that the carbon black is distributed as very fine particles inside a matrix of the base resin, thereby shortening an interval between the carbon blacks and reducing the resistance, and thus, the volume resistance may be sufficiently reduced even at a small amount and specific gravity may be lowered. More specifically, for example, any one selected from glycerin fatty acid ester and decaglycerin fatty acid ester, or a mixture thereof may be used. When these esters are used, it is preferred since an effect of reducing the space charge is clearly exhibited.

A content of the fatty acid ester (D) is not particularly limited, but may be, for example, 0.05 to 3 parts by weight, and more specifically 0.1 to 1 part by weight, based on 100 parts by weight of the base resin (A). The above-described range is preferable since the dispersibility of the carbon black may be improved and the effect of reducing the space charge may be clearly exhibited, but is not limited thereto.

In an exemplary embodiment of the present invention, the antioxidant (E) functions to prevent occurrence of a short-term or long-term space charge, and is not particularly limited as long as it is used in this field. Specifically, for example, the antioxidant may be any one or a mixture of two or more selected from a hindered phenol-based compound and a hindered amine-based compound, etc., where phenol is substituted with alkyl groups at two positions adjacent to a hydroxyl group, thereby exhibiting more excellent properties in view of the effect of reducing the space charge and the processability.

The hindered phenol-based compound may be specifically, for example, but not limited to, N,N'-hexamethylene bis[3-(3,5-di-tert-butyl-4-hydroxyphenyl)propanamide], triethyleneglycol-bis[3-(3-t-butyl-5-methyl-4-hydroxyphenyl) propionate], 4,4'-butylidene bis(3-methyl-6-t-butylphenol), 1,6-hexanediol-bis [3-(3,5-di-t-butyl-4-hydroxyphenyl)propionate], 2,4-bis-(n-octylthio)-6-(4-hydroxy-3,5-di-t-butyl anilino)-1,3,5-triazine, pentaerythrityl-tetrakis[3-(3,5-di-t-butyl-4-hydroxyphenyl)propionate], 2,2-thio-diethylenebis [3-(3,5-di-t-butyl-4-hydroxyphenyl)propionate], octadecyl-3-(3,5-di-t-butyl-4-hydroxyphenyl)propionate, 4,4'-thiobis (6-t-butyl-m-cresol), triethyleneglycol-bis-3(3-t-butyl-4-hydroxy-5-methylphenyl)propionate, 4,4'-thiobis[2-(1,1-dimethylethyl)-5-methyl-phenol], tetrakis-methylene(3,5-di-t-butyl-4-hydroxycinnamate)-methane, dilauryl thiodipropionate, 2,2-thiobis(4-methyl-6-1-butylphenol), N,N'-hexamethylenebis(3,5-di-t-butyl-4-hydroxy-hydroxycinnamamide), 3,5-di-t-butyl-4-hydroxy-benzylphosphonate-diethyl ester, 1,3,5-trimethyl-2,4,6-tris(3,5-di-butyl-4-hydroxybenzyl)benzene, bis(3,5-di-t-butyl-4-hydroxybenzylsulfonic acid ethyl calcium), tris-(3,5-di-t-butyl-4-hydroxybenzyl)-isocyanurate, 2,6-di-t-butyl-p-cresol, butylated hydroxyanisole, 2,6-di-t-butyl-4-ethylphenol, stearyl-3-(3,5-di-t-butyl-4-hydroxyphenyl) propionate, 2,2'-methylenebis-(4-methyl-6-t-butylphenol), 2,2'-methylene-bis-(4-ethyl-6-t-butylphenol), 4,4'-thiobis-(3-methyl-6-t-butylphenol), octylated diphenylamine, 2,4-bis[(octylthio)methyl]-o-cresol, isooctyl-3-(3,5-di-t-butyl-4-hydroxyphenyl)propionate, 4,4'-butylidenebis(3-methyl-6-t-butylphenol), 3,9-bis[1,1-dimethyl-2-[β-(3-t-butyl-4-hydroxy-5-methylphenyl)propionyloxy]ethyl]2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-3'-T-butylphenyl)butyric acid]glycol ester, 1,3,5-tris(3',5'-di-t-butyl-4'-hydroxybenzyl)-sec-triazine-2,4,6-(1H,3H,5H) trione, d-α-tocopherol, etc. These compounds may be used alone or in combination of two or more thereof.

The hindered amine-based compound may be specifically, for example, but not limited to, 2,2,4-trimethyl-1,2-dihydroquinoline, dimethyl succinate-1-(2-hydroxyethyl)-4-hydroxy-2,2,6,6-tetramethylpiperidine polycondensate, poly [{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}], 2-(3,5-di-t-butyl-4-hydroxybenzyl)-2-n-butylmalonic acid bis(1,2,2,6,6-pentamethyl-4-piperidyl), tetrakis(2, 2,6,6-tetramethyl-4-piperidyl) 1,2,3,4-butanetetracarboxylate, bis-2,2,6,6-tetramethyl-4-piperidyl-sebacate, bis(1,2,2, 6,6-pentamethyl-4-piperidyl)sebacate, methyl(1,2,2,6,6-pentamethyl-4-piperidyl)sebacate, 1-[2-[3-(3,5-di-t-butyl-4-hydroxyphenyl)propionyloxy]ethyl]-4-[3-(3,5-t-butyl-hydroxyphenyl)propionyloxy]2,2,6,6-tetramethylpiperidine, 4-benzoyloxy-2,2,6,6-tetramethylpiperidine, butanedioic acid, dimethylester, polymer with 4-hydroxy-2,2,6,6-tetramethyl-1-piperidine ethanol, etc. These compounds may be used alone or in combination of two or more thereof.

When the hindered phenol-based antioxidant and hindered amine-based antioxidant are used, it may be more preferable since a scorch-prevention property may be remarkably increased as compared with other antioxidants, and thus, an unexpected effect of increasing surface smoothness of the semi-conductive layer to be extruded may be exhibited. More specifically, when 2,2,4-trimethyl-1,2-dihydroquinoline is used, it may be preferable since the scorch time may be increased and the effect of reducing the space charge may be more excellent, but the present invention is not limited thereto.

A content of the antioxidant (E) is not limited, but may be specifically, for example, 0.05 to 3 parts by weight, and more specifically 0.1 to 1 part by weight, based on 100 parts by weight of the base resin (A). The above-described range is preferable since the effect of preventing scorching is remarkably exhibited, but is not limited thereto.

In an exemplary embodiment of the present invention, the cross-linking agent (F) is used for forming a composite having a network structure such as a net by forming cross-linking in the base resin, and may be any cross-linking agent as long as it is conventionally used in the art. More preferably, it is preferable to choose a half-life of the cross-linking agent at a processing temperature to be much longer than the time it takes to stay inside the extruder when producing the cable. Otherwise, a scorch phenomenon may occur inside the extruder.

The cross-linking agent may be specifically, for example, any one or a mixture of two or more selected from t-butyl cumyl peroxide, benzoyl peroxide, lauryl peroxide, cumene hydroperoxide, dicumyl peroxide, methyl ethyl ketone peroxide, 2,5-dimethyl-2,5-di(t-butylperoxy)hexane, di-t-butyl peroxide, t-butyl peroxybenzoate, α,α-bis(t-butylperoxy isopropyl)benzene, and α,α-bis(t-butylperoxy)-1,3-diisopropyl benzene, etc., but is not limited thereto. More specifically, when α,α-bis(t-butylperoxy)-1,3-diisopropyl benzene is used, it may be preferable since the cross-linking may be smoothly performed to improve long-term processing stability, but the present invention is not limited thereto.

A content of the cross-linking agent (F) is not limited, but may be specifically, for example, 0.05 to 3 parts by weight, and more specifically 0.1 to 1 part by weight, based on 100 parts by weight of the base resin (A). The above-described range may be preferable since it is possible to prevent the scorch phenomenon from occurring within a processing temperature and processing time of the composition of an exemplary embodiment of the present invention while simultaneously performing the cross-linking appropriately, thereby the surface may be smooth and the long-term extrudability may be achieved, but is not limited thereto.

In an exemplary embodiment of the present invention, the composition may further include a polyethylene-based resin grafted with maleic anhydride from the viewpoints of further lowering the space charge and further improving the mechanical properties and the long-term extrudability. A content thereof is not limited, but may be 0.1 to 20 parts by weight, more specifically 1 to 10 parts by weight, and more specifically 5 to 8 parts by weight, based on 100 parts by weight of the base resin (A). The above-described range is preferable to further exhibit physical properties to be desired, but the present invention is not limited thereto.

The polyethylene-based resin grafted with maleic anhydride may be preferably a resin grafted with 0.05 to 10 wt % of maleic anhydride and having a melting point of 120° C. or less. The composition according to an exemplary embodiment of the present invention may be prepared by co-extrusion together with an insulation layer when processing the power cable later, and thus the composition may have an extrusion temperature and a cross-linking temperature similar to those of the insulation layer. The base resin used in an exemplary embodiment of the present invention has a melting point of 120° C. or less, and thus, it is preferable that the composition has a melting point equal to or similar to that of the base resin. When the temperature is more than 120° C., surface protrusions may be formed and the appearance may be uneven.

As a specific example of the polyethylene-based resin grafted with maleic anhydride, any one or a mixture of two or more selected from maleic anhydride grafted low density polyethylene (MAH-g-LDPE), maleic anhydride grafted linear low density polyethylene (MAH-g-LLDPE), maleic anhydride grafted high density polyethylene (MAH-g-HDPE), maleic anhydride grafted ethylene vinyl acetate (MAH-g-EVA), etc., may be used, but the present invention is not limited thereto.

Further, the present invention may further include polyolefin or a copolymer thereof, if necessary. The polyolefin or copolymer thereof may further include a polymer with low density polyethylene, medium density polyethylene, high density polyethylene or other alpha olefins thereof. It may be recommended for improving processability and maintaining long-term electrical properties. When the polyolefin or the copolymer thereof is used, the polyolefin or the copolymer thereof may be included at an amount of 0.1 to 20 parts by weight based on 100 parts by weight of the base resin.

In addition, various processing aids may be further added in the present invention as needed. For example, the aid is not limited as long as it is used in this field, but preferably, for example, may be used by mixing at least one or two selected from wax series such as PE wax, paraffin wax, and stearic acid series such as zinc stearate, magnesium stearate, calcium stearate, etc.

Here, the processing aid according to the present invention may be preferably added at an amount of 0.05 to 3 parts by weight based on 100 parts by weight of the base resin, and may exhibit a good effect on uniform dispersibility of the composition of the present invention within the above-described range.

In an exemplary embodiment of the present invention, a method for preparing samples using the composition is described in detail.

In an exemplary embodiment of the present invention, the method for preparing a composition may include a measuring process of a raw material, a kneading process, a forming process of a pellet, an impregnating process of a cross-linking agent, and a packaging process.

The kneading equipment in the kneading process may be a pressure kneader. When the kneader is used, it is preferable since the dispersibility and cooling effect are excellent, but the present invention is not limited thereto. It is preferable to increase a shear speed (rotor rotational speed) of the kneader so as to improve dispersion performance of the carbon black in the base resin and to achieve uniformity. In order to optimize the dispersion of each raw material, it is preferable to put components other than the cross-linking agent into the kneader, followed by sufficiently kneading at 100 to 180° C. at a rotation speed of 20 to 40 rpm for 5 to 30 minutes.

When the kneading process is completed, a pellet is formed using an extruder and a cutter. At this time, a temperature of the extruder is preferably set to 120 to 180° C. in consideration of thermal properties of the raw materials, but is not limited thereto.

The impregnating process of the cross-linking agent is a process of impregnating a compound prepared in the pellet form with a cross-linking agent. The equipment used in the impregnating process of the cross-linking agent may be a super mixer or a ribbon blender. In order for the cross-linking agent to be melted and sufficiently impregnated into the pellet, it is preferable to standardize a pellet temperature of the material, the time of the impregnating operation, and the number of revolutions of the equipment. Specifically, the impregnating process may be performed at, for example, 70 to 100° C. and 10 to 50 rpm for 10 minutes to 60 minutes, but the present invention is not limited thereto.

In the packaging process, the material impregnated with the cross-linking agent is stored in a sealed packaging material having a certain size. In the packaging process, it is preferable to remove dust and to operate with care so that foreign materials do not enter from the outside.

In an exemplary embodiment of the present invention, a method of preparing samples to measure physical properties of the prepared composition is described in detail.

A cross-linked sample is prepared from the prepared pellet-shaped semi-conductive material for an ultra-high voltage DC power cable by using a two-roll mill and a press tester (presser). An operation using the two-roll mill may be performed by kneading (mixing) at 10 to 20 rpm for 1 to 10 minutes to melt the pellet. The two-roll mill serves to melt a test material in a similar manner as the DC semi-conductive material shape (pellet) is melted through an extruder in the insulating process when producing the ultra-high voltage DC power cable to thereby be coated on a conductor.

Then, a cross-linking reaction is performed at a pressure of 100 to 300 kg/cm² at 150 to 200° C. for 10 to 30 minutes using a press tester, thereby producing a sheet having a width of 150 mm, a length of 150 mm, and a thickness of 1.0 mm. The press tester serves to cross-link the material at high temperature of 150~200° C. in a similar manner to a cross-linking (curing) process in the insulating process when producing the high voltage DC power cable.

The physical properties measured using the sample produced in the above-described process may be described as follows: the scorch time measured at 145° C. and t5 according to ASTM D1646 is 40 minutes or more, and more specifically 40 to 60 minutes, the number of protrusions having a size of 50 to 100 μm is 5/cm² or less, and more specifically 0 to 5, and a volume resistance measured at 90° C. according to ASTM D991 is 200 Ω·cm or less, and more specifically 100 to 200 Ω·cm. When all of the physical properties are satisfied, it is more preferable since the long-term extrudability may be excellent and the surface property and electrical properties may be excellent. Further, since the effect of reducing the space charge is excellent, it is possible to exhibit physical properties that are desirable to be applied as an ultra-high voltage direct current power cable.

Another exemplary embodiment of the present invention is a power cable including at least one semi-conductive layer that includes the semi-conductive composition for a power cable. The power cable may be, for example, an alternating current cable or a direct current cable, but more specifically, may be an ultra-high voltage direct current power cable.

More specifically, for example, there may be provided an ultra-high voltage direct current power cable including a conductor, an inner semi-conductive layer surrounding the conductor, an insulator layer surrounding the inner semi-conductive layer, an outer semi-conductive layer surrounding the insulator layer, a shielding layer surrounding the outer semi-conductive layer, and an anti-corrosion covering layer surrounding the shielding layer, wherein the semi-conductive composition for a power cable according to an exemplary embodiment of the present invention may be included in at least one or more layers selected from the inner semi-conductive layer and the outer semi-conductive layer.

Hereinafter, the present invention is described in more detail on the basis of Examples and Comparative Examples. Meanwhile, the following Examples and Comparative Examples are provided by way of example for explaining the present invention in more detail, and therefore, the present invention is not limited thereto.

Before describing Examples of the present invention, physical properties of the semi-conductive resin composition for an ultra-high voltage power cable prepared by the Examples of the present invention, such as specific gravity, electric volume resistance, and tensile strength, etc., were measured by the following test methods.

(1) Viscosity

The viscosity was measured using the MV2000 (Labtech Co., Ltd., Korea).

After preheating 145° C. for 1 minute, the values were measured and read at 4 minutes elapsed after starting the rotor and displayed as 145ML1+4. Here, in the displayed 145ML1+4, M means the Mooney viscosity, L means the rotor size (rotor size: L type-⌀38.10×5.5 mm, S type-⌀30.48× 5.5 mm), 1 represents a preheating time for 1 minute, 4 represents the rotation time of the rotor at 2 rpm for 4 minutes, and 145 represents the test temperature (° C.).

(2) Scorch Time

Scorch refers to a phenomenon in which the semi-conductive composition material is cross-linked during a processing process to increase elasticity thereof, thereby rendering the product unprocessable.

The scorch time was measured using the MV2000 (Labtech Co., Ltd., Korea).

The scorch time represents the scorch time of the sample measured by a viscometer, and a test temperature is 145° C.

At the scorch time (t5, 145° C.), t5 represents the time required to rise 5 points in a unit from the lowest viscosity (ML). In general, the longer the scorch time, the better the long-term extrudability.

(3) Melt Index (MI)

The melt index of the semi-conductive composition for a power cable was measured using the LMFI-2NNNNCN (Dynisco Instruments, USA).

The MI was a value obtained by measuring an amount of the molten compound flowing through the orifice at a temperature of 125° C. and a load of 10 kgf for 10 minutes.

(4) Volume Resistance (Ω·cm)

A sample having a width of 30 mm and a length of 64 mm was prepared as a sheet having a thickness of 1 mm, and a silver paint was applied to both ends of the sample so that a distance between the electrodes was 50 mm according to ASTM D991. Then, the sample was dried at room temperature for at least 1 hour, terminals for external connection were connected to each electrode, and the sample was put into an oven preheated at a relative humidity of 50% at 23° C. and 90° C., and allowed to stand for 30 minutes, and then the volume resistance was measured.

(5) Measurement of Space Charge

The space charge is a main factor causing electric field distortion in the insulator under DC electric field and a key electrical property in the ultra-high voltage DC power cable. This is a phenomenon that occurs only in the DC in which voltage polarity is constant, unlike the alternating current (AC) in which the voltage polarity alternates. When the space charge is not accumulated, the electric field in the insulator is uniform, for example, at a level of about 50 kV/mm, but when the space charge is accumulated, a part may increase by 50% to 75 kV/mm. This results in a problem of long-term reliability and makes insulation design impossible. In a direct current cable, injection and accumulation of the space charge by the semi-conductive material are required to be small as in the insulator in order to suppress the accumulation of the space charge.

The sample for measuring the space charge was prepared into a sheet form each having a thickness of 0.2 mm by cross-linking at 180° C. for 20 minutes at a pressure of 200 kg/cm² using a press tester. The insulator sheet was then dried in an air oven at 70° C. for 24 hours for degassing. Next, the semi-conductive sample was positioned on an upper electrode and the insulator sample was positioned on a lower electrode. The electric field to be applied was measured at 50 kV/mm and room temperature (23° C.) for 60 minutes.

The charge was generated by applying a voltage through the upper electrode. In order to measure acoustic wave through the lower electrode, a polyvinylidene fluoride (PVDF) film was positioned, and on the back thereof, polymethyl methacrylate (PMMA) as a damper was positioned to prevent distortion caused by signal reflection.

A pulsed electro-acoustic method (PEA) method, which is one of non-destructive measurement methods, was used for the measurement. When the space charge was exhibited unlike the reference signal, it was judged as a defect. That is, the charge distribution inside the insulation material was measured according to selection in mixing the components of the composition of the semi-conductive material.

The number of '+' marked in the space charge item indicated a relative amount of accumulated charges. The mark of '−' indicated that there is no accumulation of charges. '+' indicated that there is a slight accumulation of charges, '++' indicated that there is a slightly more accumulation of charges, and '+++' indicated that there is a large accumulation of charges.

Therefore, as the accumulation of charges was smaller, i.e., closer to '−' indicating no space charge accumulation, better property was exhibited.

(6) Density

The density was measured using an EW-300SG (Alfa Mirage Co., Ltd., Japan).

The density of the semi-conductive resin composition was measured at room temperature and 1 atmosphere according to ASTM D 792 (Standard test method for density and specific gravity of plastic by displacement, Annual Book of ASTM Standards D792).

(7) Tensile Strength and Elongation

The tensile strength and elongation were measured using a Tensometer 2016 (Labtech Co., Ltd., Korea).

The tensile strength and the elongation of the semi-conductive resin composition were measured at room temperature and 1 atmosphere according to ASTM D 638.

The measurement range was 3.0 kg/mm$^2$ and 600%, and the measurement speed was 200 mm/min. After the experiment was performed five times, average values of the measured tensile strength and elongation were shown.

(8) Tensile Strength Residual Rate and Elongation Residual Rate after Heating Aging The tensile strength residual rate and elongation residual rate after heating aging were measured according to ASTM D 638. The sample was put into an air oven, heated at 135° C. for 168 hours, taken out, and allowed to stand at room temperature for 12 to 24 hours. The sample that was allowed to stand was heated and the tensile strength residual rate and the elongation residual rate were then measured in the same manner as the test method regarding the tensile strength and elongation at room temperature.

Tensile strength residual rate after heating aging = 
$$\frac{\text{tensile strength after heating}}{\text{tensile strength at room temperature}} \times 100$$

Elongation residual rate after heating aging = 
$$\frac{\text{elongation after heating}}{\text{elongation at room temperature}} \times 100$$

(9) Surface Smoothness Test:

A conductor shielding layer plays an important role in determining electrical reliability of the power cable, where the most important factor is the presence or absence of protrusions between the conductor shielding layer and the insulation layer. When there is a protrusion between the conductor shielding layer and the insulation layer, the electric field concentrates on the protrusion, causing local dielectric breakdown. This minute dielectric breakdown occurs repeatedly over a long period of time to thereby ultimately destroy the entire power cable.

Therefore, in order to increase the insulation reliability of the power cable, no protrusion should exist between the conductor shielding layer and the insulation layer and the surface should be smooth.

The surface smoothness was measured using an extruder having a diameter of ⌀30 mm (VS30, Tanabe Plastic Co., Ltd., Japan).

The sample was extruded and rolled under temperature conditions including 100° C. for a hopper, 110° C. for a cylinder 1, 120° C. for a cylinder 2, and 120° C. for dies. Then, a surface of a 1 mm thick tape was enlarged at 200× magnification, and the number of protrusions having a width of 0.05 mm to 0.1 mm was measured in an observation area (width of 1 cm×length of 1 cm/80 magnification or more). The standard of the protrusions was 50% or more in height to width, and the measurement was performed on the basis of width. The number of protrusions was expressed as 'number', and the unit is number/1 cm$^2$.

(10) Cross-Linking Degree:

The cross-linking degree was measured by preparing the sample according to ASTM D2765A.

The sample measured in the cross-linking degree was prepared by taking 10 g of a 1 mm cross-linked sheet, followed by pulverization into three pieces. Then, a stainless steel mesh bag (120 mesh) was made and an exact weight thereof was measured. The stainless steel mesh bag was then heated in a decahydronaphthalene solution at 190° C. for 6 hours. The bag was then taken out and dried in a vacuum oven at 150° C. for 3 hours and then cooled at room temperature. Next, the cross-linking degree was measured by the following Equation:

$$\text{Cross-linking degree} = \frac{W_3 - W_1}{W_2 - W_1} \times 100$$

$W1$: Weight (g) of stainless steel mesh bag $W2$: Weight (g) of stainless steel mesh bag with sample before heating $W3$: Weight (g) of stainless steel mesh bag with sample after heating Examples and Comparative Examples Examples and Comparative Examples were prepared with the compositions shown in Table 1 below.

Each composition obtained by adding components except for the cross-linking agent to a 5 L pressure kneader (Kneader. FINE MACHINERY IND., CO., LTD.), followed by sufficiently kneading at 120° C. and a rotation speed of 40 rpm for 20 minutes was prepared into a pellet form by using a single-screw extruder having a screw diameter of ⌀50 mm and an underwater cutter.

Then, the pellets were impregnated with a cross-linking agent by applying a temperature below a melting point of the base resin, specifically 80° C. on the pellets using a ribbon blender. The pellets impregnated with the cross-linking agent were then secondarily kneaded for 5 minutes at 15 rpm using a two-roll mill.

Next, the pellets were subjected to cross-linking reaction at 180° C. for 15 minutes under a pressure of 200 kg/cm² using a press tester to be prepared into a sheet form each having a width of 150 mm, a length of 150 mm, and a thickness of 1 mm.

Thermal properties, electrical properties, mechanical properties, and structural properties were measured using the prepared samples in sheet forms. The results are shown in Table below.

The raw materials of the following Tables 1 and 2 are described as follows, wherein the unit is parts by weight.

EBA: An ethylene-butyl acrylate copolymer in which a butyl acrylate content is 15 wt %, and a melt index measured at 190° C. and 2.16 kg according to ASTM D1238 is 15 g/10 min.

EEA: An ethylene-ethyl acrylate copolymer in which an ethyl acrylate content is 10 wt %, and a melt index measured at 190° C. and 2.16 kg according to ASTM D1238 is 20 g/10 min.

Acetylene black: A high purity and high conductivity acetylene carbon black in which an ash content according to ASTM D1506-99 is 0.010 wt % and a specific surface area according to ASTM D3037-89 is 69 m²/g.

Furnace black 1: A high purity and high conductivity furnace carbon black in which an ash content according to ASTM D1506-99 is 0.010 wt % and a specific surface area according to ASTM D3037-89 is 65 m²/g.

Furnace black 2: A low purity and general conductivity furnace carbon black in which an ash content according to ASTM D1506-99 is 0.5 wt % and a specific surface area according to ASTM D3037-89 is 41 m²/g.

MAH-g-LDPE: A low density polyethylene grafted with maleic anhydride in which a melt index measured at 230° C. according to ASTM D1238 is 3 g/10 min and a VICAT softening point according to ASTM D1525 is 82° C.

MAH-g-PP: A polypropylene grafted with maleic anhydride in which a melt index measured at 230° C. according to ASTM D1238 is 8 g/10 min and a VICAT softening point according to ASTM D1525 is 120° C.

TABLE 1

| Classification | Example 1 | Example 2 | Example 3 | Example 4 | Example 5 | Example 6 | Example 7 |
|---|---|---|---|---|---|---|---|
| (A) EBA | 100 | 100 | 100 | 70 | 100 | 100 | 100 |
| EEA | — | — | — | 30 | — | — | — |
| (B) 2,4-Diphenyl-4-methyl-1-pentene | 0.15 | 0.15 | 0.15 | 0.15 | 2 | 3.5 | 0.15 |
| (C) Acetylene black | 45 | — | 45 | 45 | 45 | 45 | — |
| Furnace black 1 | — | 45 | — | — | — | — | — |
| Furnace black 2 | — | — | — | — | — | — | 45 |
| (D) Decaglycerine heptastearate | 0.15 | 0.15 | 0.15 | 0.15 | 0.15 | 0.15 | 0.15 |
| (E) 2,2,4-Trimethyl-1,2-dihydroquinoline | 1 | 1 | 1 | 1 | 1 | 1 | 1 |
| (F) α,α-bis(t-butylperoxy)-1,3-diisopropylbenzene | 1 | 1 | 1 | 1 | 1 | 1 | 1 |
| (G) MAH-g-LDPE | — | — | 5 | — | — | — | — |
| MAH-g-PP | — | — | — | — | — | — | — |

TABLE 2

| Classification | Comparative Example 1 | Comparative Example 2 | Comparative Example 3 | Comparative Example 4 | Comparative Example 5 |
|---|---|---|---|---|---|
| (A) EBA | 100 | 100 | 100 | 100 | 100 |
| EEA | — | — | — | — | — |
| (B) 2,4-Diphenyl-4-methyl-1-pentene | — | 0.3 | 0.15 | 0.15 | — |
| (C) Acetylene black | 45 | 45 | 45 | 45 | 45 |
| Furnace Black 1 | — | — | — | — | — |
| (D) Decaglycerine heptastearate | 0.15 | — | — | 0.15 | — |
| (E) 2,2,4-Trimethyl-1,2-dihydroquinolline | 1 | 1 | 1 | — | 1 |
| (F) α,α-bis(t-butylperoxy)-1,3-diisopropylbenzene | 1 | 1 | 1 | 1 | 1 |
| (G) MAH-g-LDPE | — | — | — | — | — |
| MAH-g-PP | — | — | — | — | 5 |

TABLE 3

| Physical properties | | Test Method | Unit | Example 1 | 2 | 3 | 4 | 5 | 6 | 7 |
|---|---|---|---|---|---|---|---|---|---|---|
| Thermal properties | Viscosity (ML1 + 4, 145° C.) | ASTM D1646 | — | 22.1 | 22.4 | 23.5 | 22.5 | 22.6 | 22.4 | 21.6 |
| | Scorch (t5, 145° C.) | ASTM D1646 | min:sec | 44:21 | 45:12 | 52:03 | 46:32 | 58:03 | 62:32 | 32:25 |
| | MI (Melt Index) (125° C.) | ASTM D1238 | g/10 min | 0.62 | 0.61 | 0.64 | 0.62 | 0.62 | 0.62 | 0.5 |
| Electrical properties | Volume resistance 23° C. | ASTM D991 | Ω · cm | 57 | 59 | 52 | 56 | 57 | 60 | 308 |
| | 90° C. | ASTM D991 | Ω · cm | 187 | 189 | 152 | 178 | 195 | 190 | 856 |
| | Space charge (23° C.) | PEA | - | − | + | − | − | + | − | + | +++ |
| Mechanical properties | Density (23° C.) | ASTM D792 | g/cm³ | 1.101 | 1.101 | 1.104 | 1.103 | 1.102 | 1.103 | 1.103 |
| | Before heating (23° C.) Tensile strength | ASTM D638 | kg/mm² | 1.49 | 1.51 | 1.58 | 1.50 | 1.51 | 1.50 | 1.42 |
| | Elongation | ASTM D638 | % | 351 | 358 | 371 | 352 | 353 | 355 | 312 |
| | After heating (135° C., 168 hrs) Tensile strength residual rate | ASTM D638 | % | 104.4 | 103.6 | 104.0 | 104.8 | 104.6 | 104.5 | 87.4 |
| | Elongation residual rate | ASTM D638 | % | 103.7 | 103.5 | 104.3 | 103.9 | 103.5 | 103.6 | 82.5 |
| | Cross-linking degree (190° C., 6 hrs) | ASTM D2765A | % | 85.9 | 85.7 | 85.5 | 85.8 | 82.4 | 80.7 | 78.8 |
| Structural characteristic | Surface smoothness 50~100 [μm] | — | number/1 cm² | 2 | 3 | 0 | 2 | 1 | 5 | 18 |

TABLE 4

| Physical properties | | Test method | Unit | Comparative Example 1 | 2 | 3 | 4 | 5 |
|---|---|---|---|---|---|---|---|---|
| Thermal properties | Viscosity (ML1 + 4, 145° C.) | ASTM D1646 | — | 23.8 | 23.2 | 23.9 | 23.1 | 23.7 |
| | Scorch (t5, 145° C.) | ASTM D1646 | min:sec | 20:01 | 28:10 | 25:03 | 29:24 | 18:05 |
| | MI (Melt Index) (125° C.) | ASTM D1238 | g/10 min | 0.59 | 0.60 | 0.58 | 0.59 | 0.58 |
| Electrical properties | Volume resistance 23° C. | ASTM D991 | Ω · cm | 122 | 105 | 111 | 108 | 102 |
| | 90° C. | ASTM D991 | Ω · cm | 432 | 365 | 338 | 398 | 359 |
| | Space charge (23° C.) | PEA | - | +++ | +++ | +++ | ++ | +++ |
| Mechanical properties | Density (23° C.) | ASTM D792 | g/cm² | 1.101 | 1.102 | 1.101 | 1.101 | 1.101 |
| | Before heating (23° C.) Tensile strength | ASTM D638 | kg/mm² | 1.48 | 1.45 | 1.44 | 1.48 | 1.44 |
| | Elongation | ASTM D638 | % | 352 | 354 | 350 | 357 | 349 |
| | After heating (135° C., 168 hrs) Tensile strength residual rate | ASTM D638 | % | 97.5 | 96.3 | 96.4 | 93.3 | 92.3 |
| | Elongation residual rate | ASTM D638 | % | 89.2 | 87.5 | 88.0 | 89.4 | 87.3 |
| | Cross-linking degree (190° C., 6 hrs) | ASTM D2765A | % | 81.0 | 82.1 | 82.5 | 81.8 | 81.2 |
| Structural characteristic | Surface smoothness 50~100 [μm] | — | number/1 cm² | 8 | 12 | 10 | 9 | 11 |

As shown in Table 3, it could be appreciated that Examples 1 to 6 that included all the components of the present invention, were excellent in reducing the space charge. In particular, it could be appreciated that in Example 3 of the present invention in which the low density polyethylene grafted with maleic anhydride was contained, the surface smoothness was particularly excellent and the effect of reducing the space charge was very excellent. Further, it could be appreciated that in all of the Examples of the present invention, the volume resistance at a high temperature was relatively low and the effect regarding the scorch property was also very excellent, and thus the process stability and the electrical properties were also excellent. It could be appreciated that in Example 7 in which the general conductive carbon black was used rather than the high purity and high conductivity carbon black, the space charge was much larger than that of the other Examples.

It could be appreciated that as shown in Comparative Examples 1 to 5 in Table 4 above, when one of the components was excluded, the scorch property was poor, and thus the cross-linking excessively occurred during processing, which caused bad processability, and further, foreign materials occurred during the processing due to the poor scorch property. These results were also supported by the observation results of the protrusions on the protrusion parts of the surface. It could be appreciated that due to these disadvantages, the Comparative Examples did not exhibit the special effect of reducing the space charge unlike the Examples of the present invention.

As described above, it will be understood by those skilled in the art that the present invention can be practiced in other specific forms without modifying technical idea or essential characteristics thereof.

Accordingly, the exemplary embodiments described herein are provided by way of example only and should not be construed as being limited. It is intended that all changes and modifications derived from the meaning and scope of the claims to be described below and their equivalents besides the detailed description may be included within the scope of the present invention.

The invention claimed is:

1. A semi-conductive composition for an ultra-high voltage direct current power cable comprising:
   (A) an ethylene-butyl acrylate copolymer as a base resin,
   (B) a cross-linking inhibitor which is any one selected from 2,4-diphenyl-4-methyl-1-pentene and 1,4-hydroquinone, or a mixture thereof,
   (C) a carbon black which has an ash content according to ASTM D1506-99 of 0.02 wt% or less and a specific surface area according to ASTM D3037-89 of 60 to 150 m$^2$/g and is any one selected from acetylene black and furnace black, or a mixture thereof,
   (D) a fatty acid ester which is any one selected from glycerin fatty acid ester and decaglycerin fatty acid ester, or a mixture thereof,
   (E) an antioxidant, and
   (F) a cross-linking agent;
   wherein a scorch time of the semi-conductive composition is forty minutes or more at 145° C. and t5 according to ASTM D1646; and
   wherein the semi-conductive composition has a surface smoothness such that a number of protrusions having a size of 50 to 100 μm is 5/cm$^2$ or less.

2. The semi-conductive composition for a power cable of claim 1, wherein 0.05 to 3 parts by weight of the cross-linking inhibitor (B), 30 to 70 parts by weight of the carbon black (C), 0.05 to 3 parts by weight of the fatty acid ester (D), 0.05 to 3 parts by weight of the antioxidant (E), and 0.05 to 3 parts by weight of the cross-linking agent (F) are included based on 100 parts by weight of the base resin (A).

3. The semi-conductive composition for a power cable of claim 1, wherein in the ethylene-butyl acrylate copolymer, a content of butyl acrylate is 5 to 20 wt%, and a melt index measured at 190° C. and 2.16 kg according to ASTM D1238 is 1 to 30 g/10 min.

4. The semi-conductive composition for a power cable of claim 1, wherein the base resin (A) further includes any one or two or more resins selected from an ethylene-ethyl acrylate copolymer, an ethylene-methyl acrylate copolymer, and an ethylene-vinyl acetate copolymer.

5. The semi-conductive composition for a power cable of claim 1, further comprising: a polyethylene-based resin grafted with maleic anhydride.

6. The semi-conductive composition for a power cable of claim 5, wherein the polyethylene-based resin grafted with the maleic anhydride has an amount of 0.1 to 20 parts by weight based on 100 parts by weight of the base resin (A).

7. The semi-conductive composition for a power cable of claim 1, wherein the antioxidant is any one or a mixture of two or more selected from the group consisting of a hindered phenol-based compound and a hindered amine-based compound.

8. The semi-conductive composition for a power cable of claim 1, wherein the cross-linking agent is any one or a mixture of two or more selected from t-butyl cumyl peroxide, benzoyl peroxide, lauryl peroxide, cumene hydroperoxide, dicumyl peroxide, methyl ethyl ketone peroxide, 2,5-dimethyl-2,5-di(t-butylperoxy)hexane, di-t-butyl peroxide, t-butyl peroxybenzoate, α,α-bis(t-butylperoxy isopropyl)benzene, and α,α-bis(t-butylperoxy)-1,3-diisopropyl benzene.

9. The semi-conductive composition for a power cable of claim 1, wherein a volume resistance measured at 90° C. according to ASTM D991 is 200 Ω·cm or less.

* * * * *